(12) United States Patent
Kobayashi

(10) Patent No.: US 7,095,218 B2
(45) Date of Patent: Aug. 22, 2006

(54) CURRENT DETECTING METHOD AND DEVICE FOR A DC-DC CONVERTER

(75) Inventor: Hidenori Kobayashi, Nagano (JP)

(73) Assignee: Fuji Electric Holdings Co., Ltd., Tokyo (JP)

( * ) Notice: Subject to any disclaimer, the term of this patent is extended or adjusted under 35 U.S.C. 154(b) by 70 days.

(21) Appl. No.: 10/912,537

(22) Filed: Aug. 6, 2004

(65) Prior Publication Data

US 2005/0057229 A1 Mar. 17, 2005

(30) Foreign Application Priority Data

Aug. 19, 2003 (JP) ............................. 2003-294789

(51) Int. Cl.
*G05F 1/40* (2006.01)
(52) U.S. Cl. ...................................... 323/282; 323/285
(58) Field of Classification Search ........ 323/282–288, 323/272, 222, 268, 277; 363/50, 56.2, 98, 363/132
See application file for complete search history.

(56) References Cited

U.S. PATENT DOCUMENTS 6,127,814 A * 10/2000 Goder ......................... 323/282

6,310,953 B1 * 10/2001 Yoshida et al. ......... 379/399.01
6,441,597 B1 * 8/2002 Lethellier ................... 323/282

FOREIGN PATENT DOCUMENTS

JP 2002-010627 1/2002

* cited by examiner

*Primary Examiner*—Rajnikant B. Patel
(74) *Attorney, Agent, or Firm*—Rabin & Berdo, P.C.

(57) ABSTRACT

A current detecting device and method that detects a variation in a current being supplied to a load in supplying variable DC power to the load via an inductor from a synchronous rectification DC-DC converter in which a high-side switch is connected to one electrode of a DC input voltage source and a low-side switch connected to the other electrode. The switches are turned on and off alternately during a prescribed switching period. A low-pass filter is connected to a signal line that leads from a connecting point of the inductor and the switches. An operation circuit detects an output current of the DC-DC converter by performing an operation on the difference between an output voltage of the low-pass filter and an output voltage of the DC-DC converter.

6 Claims, 5 Drawing Sheets

CURRENT DETECTING METHOD AND DEVICE FOR A DC-DC CONVERTER

BACKGROUND OF THE INVENTION

1. Field of the Invention

The invention relates to a current detecting method and device for a DC-DC converter. In particular, the invention relates to such a method and device for detecting a variation in a DC current being supplied to a load in supplying variable DC power to the load via an inductor from a synchronous rectification DC-DC converter in which a first switching element connected to one electrode of a DC input power source and a second switching element connected to the other electrode are turned on and off alternately in a prescribed period.

2. Background Art

In step-down-type synchronous rectification switching converters etc. overcurrent protection may be performed for a load, or a function may be implemented where the occurrence of switching to a light load (the output current is small) is judged and a transition automatically is made to a light load mode. In such instances it is necessary to detect, in a prescribed switching period, an average current being actually supplied to the load.

Conventional current detecting methods for a DC-DC converter commonly employ a technique wherein a resistor is inserted in an output current path and a potential difference between opposite ends of the resistor is detected and converted into a current value. However, this technique has a problem that the insertion of the resistor lowers the power conversion efficiency of the DC-DC converter. In view of this, in recent years, a technique has become common wherein a current variation is detected by detecting a variation in the voltage across a switching element, such as by utilizing the on-resistance of the switching element to detect that a transistor is in an on state.

However, the on-resistance of a transistor tends to be influenced by process variations, variation in environment temperature, etc. Further, where importance is attached to power conversion efficiency converters use transistors having a small on-resistance. This makes detection of a very small voltage variation necessary, and results in a problem of insufficient measurement accuracy.

In view of the above, a technique has been proposed that an on-resistance and a detection resistor are connected to each other serially to increase the accuracy of measurement of a voltage variation. However, in JP-A-2002-10627 (paragraphs [0011]–[0026] and FIGS. 1 and 2), power loss occurs in the detection resistor and hence the power conversion efficiency of the converter is lowered. Further, a measuring circuit is required to perform a measurement only when the transistor is on. This makes it difficult to realize a detection circuit for securing high measurement accuracy, particularly in a case that the switching frequency is high.

OBJECT AND SUMMARY OF THE INVENTION

The invention has been made to solve the above problems. Therefore, an object of the invention is to provide a current detecting method and device for a DC-DC converter capable of detecting an average current with high accuracy on a small circuit scale.

The invention provides a method for detecting a variation in a current being supplied to a load in supplying variable DC power to the load via an inductor from a synchronous rectification DC-DC converter. A first switching element connected to one electrode of a DC input power source and a second switching element connected to the other electrode of the source are turned on and off alternately during a prescribed switching period. An output current being supplied to the load is detected by comparing a voltage at a connecting point of the inductor and the first and second switching elements with an output voltage applied to the load during each switching period.

The invention also provides a current detecting device for a DC-DC converter for detecting a variation in a current being supplied to a load in supplying variable DC power to the load via an inductor from a synchronous rectification DC-DC converter in which a first switching element is connected to one of two electrodes of a DC input power source and a second switching element connected to the other electrode are turned on and off alternately during a prescribed switching period. A low-pass filter is connected to a signal line that leads from a connecting point of the inductor and the first and second switching elements. An operation circuit detects an output current of the DC-DC converter by determining a difference between an output voltage of the low-pass filter and an output voltage applied to the load.

A current detecting device according to the invention can be constructed by merely a simple low-pass filter and an operation circuit, and easily can perform current detection by utilizing a parasitic resistance component of the inductor. Since the parasitic resistance of the inductor is lower in process dependence and temperature dependence than the on-resistance of a semiconductor switch, a current value can be detected with a higher degree of accuracy. The current detecting device according to the invention is particularly suitable, for example, for where overcurrent protection is provided for a load and a large current is detected.

DETAILED DESCRIPTION OF THE PREFERRED EMBODIMENTS

The invention may be applied to a one-chip switching power source incorporating a control circuit and MOS transistors of a switching circuit as an output stage. Embodiments of the invention wherein current detecting devices are applied to such a one-chip switching power source will be described below.

First Embodiment

Figure 1:
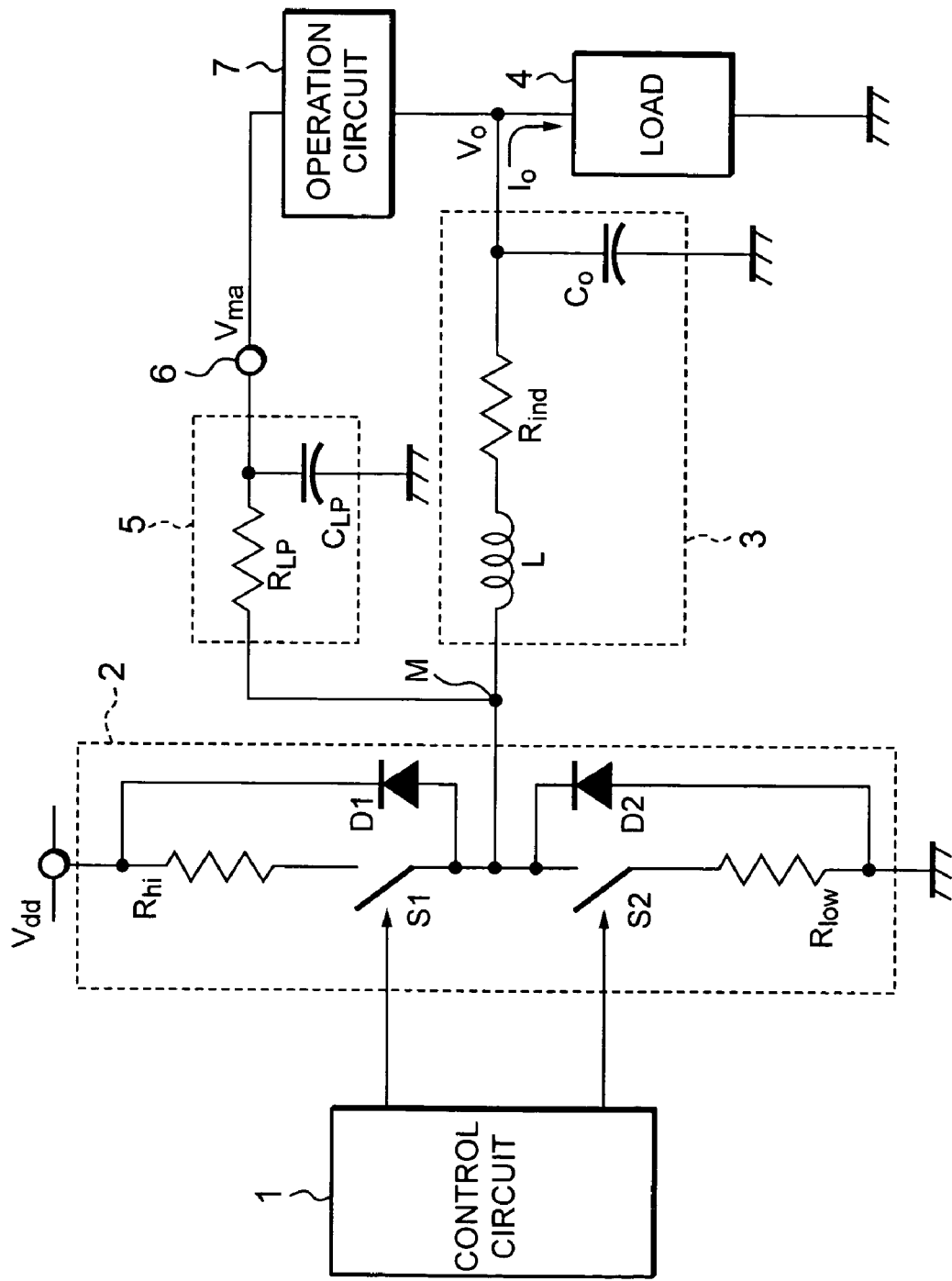
FIG. 1 shows a current detecting device for a DC-DC converter according to a first embodiment of the invention.

FIG. 1 shows a current detecting device for a DC-DC converter according to a first embodiment of the invention. As shown in this figure, a control circuit 1 is connected to a switching is circuit 2 and provides control for producing a prescribed lower DC voltage using the power supply voltage of a DC input voltage source $V_{dd}$. The switching circuit 2 as an output stage is configured so that the voltage of the DC input voltage source $V_{dd}$ is applied to one end of a high-side switch S1 (first switching element) and the other end of the high-side switch S1 is connected to one end of a low-side switch S2 (second switching element). The other end of the low-side switch S2 is grounded. A load 4 is connected to the switching circuit 2 via a smoothing circuit 3 that consists of an inductor L and an output capacitor $C_o$. The two switches S1 and S2 are controlled by the control circuit 1 to turn on and off alternately during a prescribed switching period, whereby a synchronous rectification DC-DC converter for supplying a prescribed output voltage $V_o$ to the load 4 is formed. A low-pass filter 5 is provided between a detection terminal 6 and a signal line leading from the connecting point M of the switching circuit 2 and the smoothing circuit 3. The low-pass filter 5 consists of a filter resistor $R_{LP}$ and a filter capacitor $C_{LP}$. One end of the filter resistor $R_{LP}$ is connected to the connecting point M and the other end is connected to the detection terminal 6. One end of the filter capacitor $C_{LP}$ is connected to the other end of the filter resistor $R_{LP}$. The other end of the filter capacitor $C_{LP}$ is grounded.

In the switching circuit 2 shown in FIG. 1, each of the switches S1 and S2 is a switching transistor such as a MOSFET having a parasitic resistance component. In FIG. 1, $R_{hi}$ and $R_{low}$ represent on-resistance components of the switches S1 and S2, respectively. Diodes D1 and D2 are connected in parallel to the respective switches S1 and S2. Where the switching transistors are MOS transistors, the diodes D1 and D2 may be parasitic diodes. Also, a parasitic resistance component of the inductor L of the smoothing circuit 3 is shown as a resistor $R_{ind}$ in FIG. 1. However, in an actual circuit, the resistors $R_{hi}$, $R_{low}$, and $R_{ind}$ are not provided as separate resistors.

The principle of operation for detecting a DC-DC converter current according to the detecting method of the invention is described below. First described is a case in which a current close to or larger than a rated current flows into the load 4 as an output current $I_o$, and no current (what is called backward current) flows into the switching circuit 2. Such a case may be where overcurrent protection is performed for the load 4.

Figure 2:
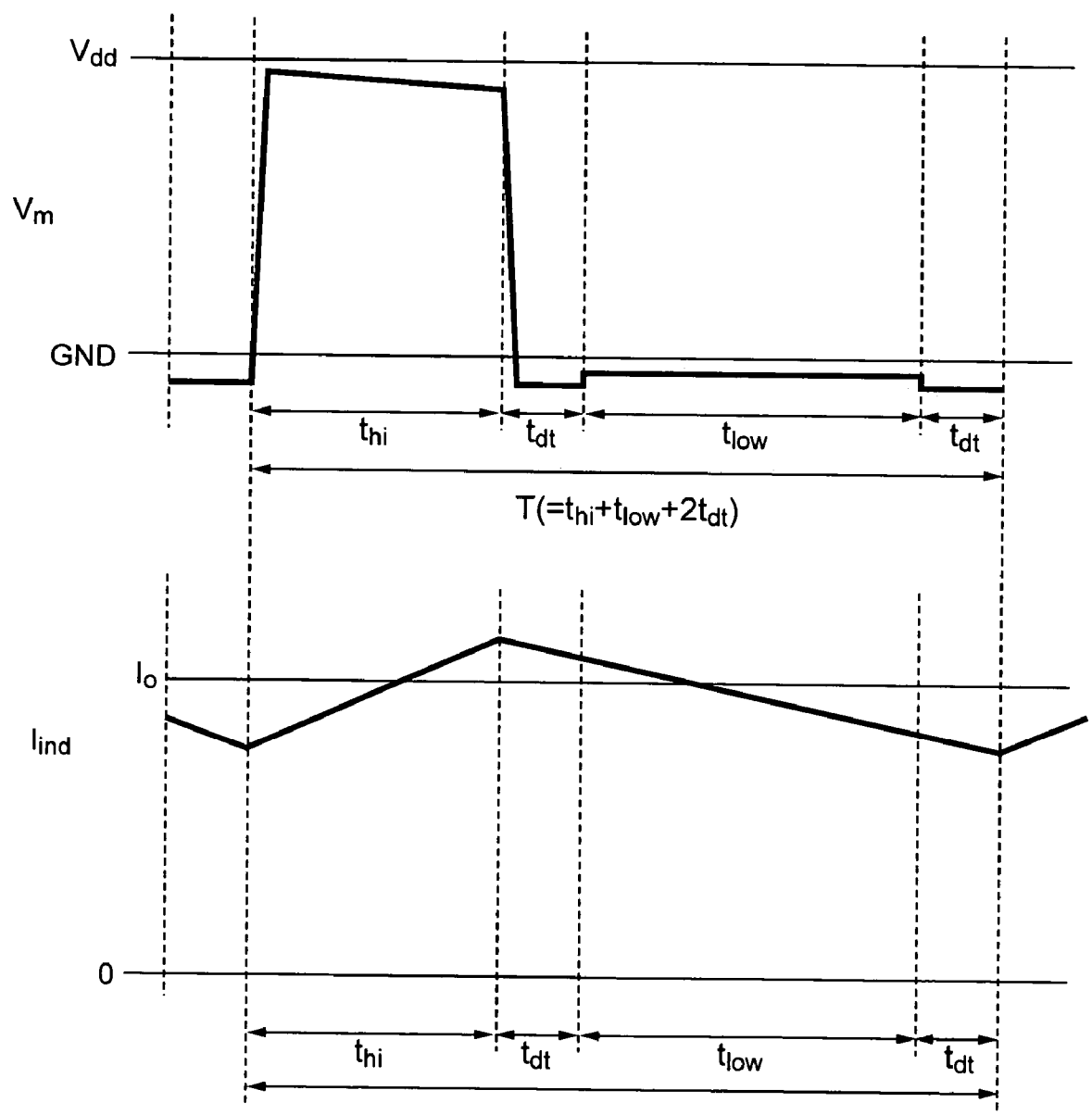
FIG. 2 shows how a voltage $V_m$ at a connecting point M of an inductor L and a current $I_{ind}$ flowing through the inductor L vary.

FIG. 2 shows how a voltage $V_m$ at the connecting point M of the inductor L and a current $I_{ind}$ flowing through the inductor L vary. A switching period of the switching circuit 2 is represented by T. Only the high-side switch S1 is kept on, during a first on-period $t_{hi}$. After a short dead time $t_{dt}$, only the low-side switch S2 is kept on, during an on-period $t_{low}$. Finally, a short dead time $t_{dt}$ occurs again to complete one cycle. The next switching period starts immediately. The dead time $t_{dt}$ is a set period when both switches S1 and S2 are kept off and is usually limited to between several nanoseconds and several tens of nanoseconds. Although the dead times $t_{dt}$ are exaggerated in FIG. 2 for the convenience of illustration, actually they are much shorter than the on-periods $t_{hi}$ and $t_{low}$ of the switches S1 and S2. In each dead time $t_{dt}$, the diode D2, which is connected to the low-side switch S2 in parallel, is turned on because of action of the inductor L, and a current flows from the ground (GND) to the output side.

First, we calculate an output voltage $V_o$, that is, the voltage of the load 4. In the following, the magnitude of the output current $I_o$ (i.e., the average of the inductor current) is represented by $I_o$, the resistance of the parasitic resistance component and the inductance of the inductor L are represented by $R_{ind}$ and L, and the resistance values of the on-resistance components of the transistors serving as the switches S1 and S2 are represented by $R_{hi}$ and $R_{low}$. Also, the forward voltage of the diodes D1 and D2 is represented by $V_f$, and the power supply voltage of the DC input voltage source $V_{dd}$ is represented by $V_{dd}$.

A current increase $$\{(V_{dd}-I_o \cdot R_{hi})-(V_o+I_o \cdot R_{ind})\} \cdot (1/L) \cdot t_{hi}$$

occurs during the on-period $t_{hi}$ of the high-side switch S1.

The current decreases during each of the subsequent dead time $t_{dt}$, on-period $t_{low}$ of the low-side switch S2, and following dead time $t_{dt}$. The current decrease is the sum of $$\{(V_o+I_o \cdot R_{ind})-(-V_f)\} \cdot (1/L) \cdot 2t_{dt}$$

and $$\{(V_o+I_o \cdot R_{ind})-(-I_o \cdot R_{low})\} \cdot (1/L) \cdot t_{low}.$$

It is assumed that in the steady state the magnitude of the output current is equal to the average value $I_o$ of the inductor current. Since the current increase is equal to the current decrease in each cycle, the output voltage $V_o$ is given by the following Equation (1) with the switching period T normalized to 1:

$$V_o = t_{hi}(V_{dd}-I_o \cdot R_{hi})-t_{low} \cdot I_o \cdot R_{low}-2t_{dt} \cdot V_f - I_o \cdot R_{ind} \quad (1)$$

Incidentally, in the current detecting device for a DC-DC converter shown in FIG. 1, the low-pass filter 5 consisting of the resistor and the capacitor is connected to the input side of the inductor L. The output voltage $V_{ma}$ of the low-pass filter 5, which can be taken out from the detection terminal 6, can be calculated as follows by normalizing the switching period T to 1.

A charge increase $$\{(V_{dd}-I_o \cdot R_{hi})-V_{ma}\} \cdot (1/R_{LP}) \cdot t_{hi}$$

occurs during the on-period $t_{hi}$ of the high-side switch S1.

The current decreases during each of the subsequent dead time $t_{dt}$, on-period $t_{low}$ of the low-side switch S2, and dead time $t_{dt}$. The current decrease is the sum of $$\{V_{ma}-(-V_f)\} \cdot (1/R_{LP}) \cdot 2t_{dt}$$

and $$\{V_{ma}-(-I_o \cdot R_{low})\} \cdot (1/R_{LP}) \cdot t_{low}.$$

Since the amount of charge that flows in during each cycle is equal to the amount of the decrease in charge during each cycle, the output voltage $V_{ma}$ is calculated according to the following Equation (2):

$$V_{ma} = t_{hi}(V_{dd}-I_o \cdot R_{hi})-t_{low} \cdot I_o \cdot R_{low}-2t_{dt} \cdot V_f \quad (2)$$

From Equations (1) and (2), the potential difference between $V_o$ and $V_{ma}$ is calculated as $$V_o - V_{ma} = I_o \cdot R_{ind}. \quad (3)$$

It is therefore understood that the magnitude of the output current $I_o$ easily can be calculated from the difference between the output voltage $V_o$ applied to the load 4 and the output voltage $V_{ma}$ taken out from the detection terminal 6 by using the parasitic resistance component $R_{ind}$ of the inductor L. This calculation can be performed by the control circuit 1.

According to the first embodiment, the current detecting device can be constructed by merely the very simple low-pass filter 5 and an operation circuit, utilizing the parasitic resistance component $R_{ind}$ of the inductor L. In particular, the method for detecting a large current, for example in a case that overcurrent protection is provided, can be realized easily. Since the parasitic resistance of the inductor L is lower in process dependence and temperature dependence than the on-resistance of a semiconductor switch, a current value can be detected with a high degree of accuracy.

Second Embodiment

Next, a current detecting device according to a second embodiment is described with reference to FIG. 3. As in the case of the first embodiment, the description is directed to a case in which no current (what is called backward current) flows into the switching circuit 2 from the output side (load 4).

Figure 3:
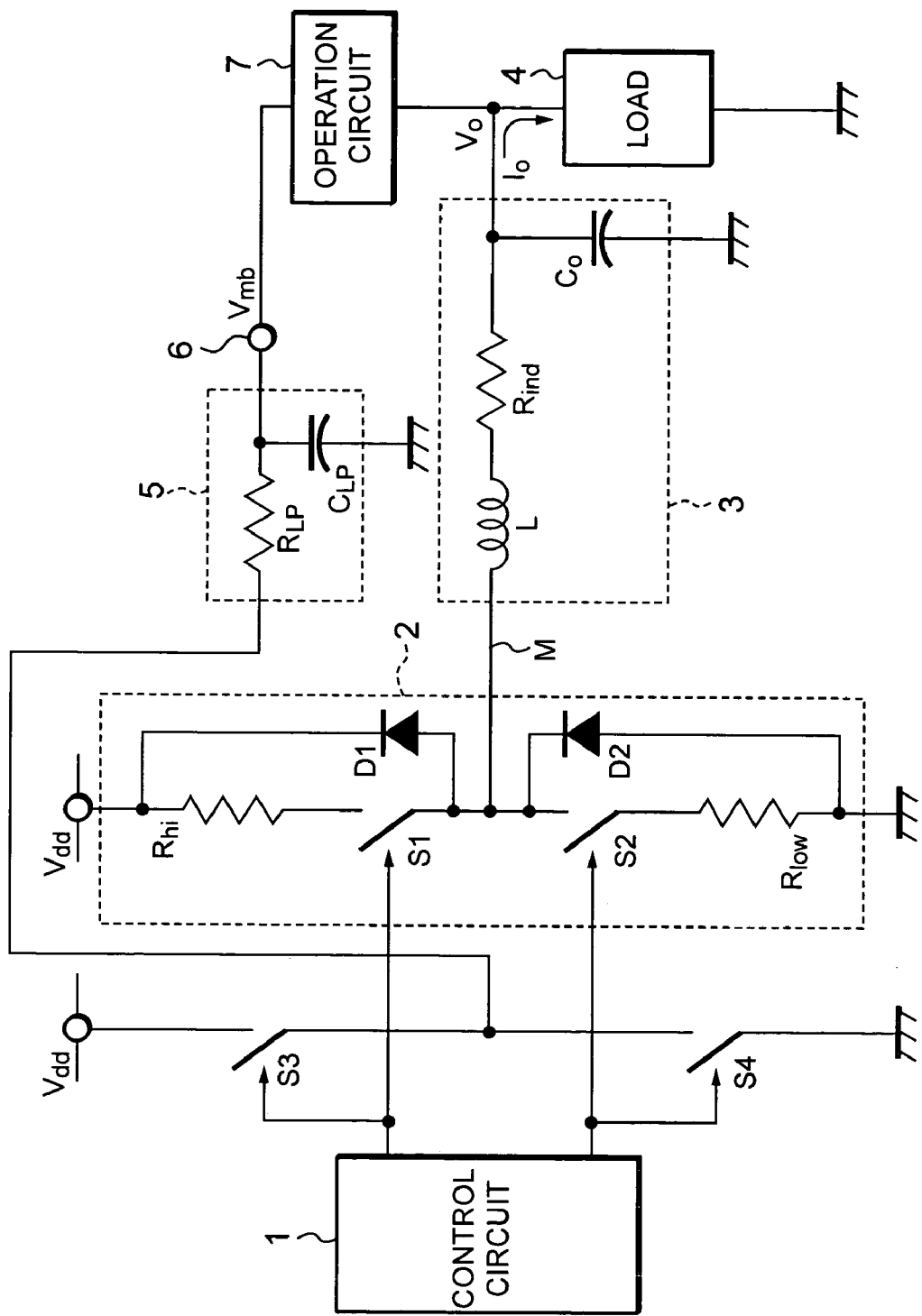
FIG. 3 shows a current detecting device for a DC-DC converter according to a second embodiment of the invention.

In the embodiment of FIG. 3, a dummy switching circuit consisting of third and fourth switching elements S3 and S4 is provided separately from the switching circuit 2 as the main output stage. The third and fourth switching elements S3 and S4 are turned on and off alternately in synchronism with the first and second switching elements S1 and S2, respectively.

Components in FIG. 3 having corresponding components in FIG. 1 are given the same reference symbols as the latter and will not be described. The switching elements S3 and S4 constituting the dummy switching circuit need not have the same size as the switching elements S1 and S2 of the main output stage. In fact, from the viewpoints of power consumption and cost, it is desirable that the switching elements S3 and S4 be as small as possible, while they are the same in the structures, and the ratio between the channel length and the channel width, as the switching elements S1 and S2.

In the second embodiment, the low-pass filter 5 is connected to the dummy switching circuit (switching elements S3 and S4). A current value can be detected with a high degree of accuracy on the same principle as described above with respect to the first embodiment, by comparing an output voltage $V_{mb}$ of the low-pass filter 5 with an output voltage $V_o$ of the converter. Further, the second embodiment differs from the first embodiment in that no inductor is connected to the dummy switching circuit and no output current flows through it in a steady state. Therefore, there is no voltage drop due to a diode during the dead time and no voltage drop due to the on-resistance components of the switching elements S3 and S4. Still further, during the dead time, the parasitic capacitance of the dummy switching circuit allows an input voltage $V_m$ of the low-pass filter 5 to be kept at an immediately preceding voltage value. Therefore, the output voltage $V_{mb}$ of the low-pass filter 5 can be calculated in the following manner.

Since a current flows into the filter capacitor $C_{LP}$ of the low-pass filter 5 during the on-period $t_{hi}$ of the high-side switch S1 and the subsequent dead time $t_{dt}$, there occurs a charge increase $$(V_{dd} - V_{mb}) \cdot (1/R_{LP}) \cdot (t_{hi} + t_{dt}).$$

A current flows out of the filter capacitor $C_{LP}$ of the low-pass filter 5 during the on-period $t_{low}$ of the low-side switch S2 and the subsequent dead time $t_{dt}$. A charge decrease at this time is equal to $$(V_{mb}/R_{LP}) \cdot (t_{low} + t_{dt}).$$

With an assumption that the amount of charge that flows in during each cycle is equal to the amount of charge decrease during each cycle, the output voltage $V_{mb}$ is calculated by the following Equation (4):

$$V_{mb} = (t_{hi} + t_{dt}) \cdot V_{dd}. \tag{4}$$

From Equations (1) and (4), the potential difference between $V_{mb}$ and $V_o$ is calculated as follows:

$$V_{mb} - V_o = t_{hi} \cdot I_o \cdot R_{hi} + t_{low} \cdot I_o \cdot R_{low} + 2t_{dt} \cdot V_f + t_{dt} \cdot V_{dd} + I_o \cdot R_{ind} \tag{5}$$

Equation (5) can be rearranged to obtain the following Equation (6) by dividing it into a term having $I_o$ and a term not having $I_o$:

$$V_{mb} - V_o = (t_{hi} \cdot R_{hi} + t_{low} \cdot R_{low} + R_{ind}) \cdot I_o + t_{dt}(2V_f + V_{dd}). \tag{6}$$

In Equation (6), the coefficient $(t_{hi} \cdot R_{hi} + t_{low} \cdot R_{low} + R_{ind})$ of $I_o$ includes both of the on-resistance values of the transistors of the switches S1 and S2, and the parasitic resistance of the inductor L. Therefore, in detecting a potential difference between $V_{mb}$ and $V_o$, a larger detection voltage can be obtained than in a case that only the parasitic resistance component $R_{ind}$ of the inductor L is included (see Equation (3) in the above description of the first embodiment), in a case that only the on-resistances of the transistors are included, or a like case. This enables current detection with higher accuracy.

In this embodiment, the measured voltage and current are offset because of the dead time $t_{dt}$. However, offset values do not cause any problem because the dead time $t_{dt}$ is so much shorter than $t_{hi}$ and $t_{low}$ as to be negligible. Even if the voltage and current offset values are not negligible, they can be eliminated as mere offsets as long as the dead time $t_{dt}$ is fixed.

Third Embodiment

Next described is a detecting device that serves to judge that the output current $I_o$ is small (the load is light), and automatically makes a transition to a light load mode. The principle of its detecting operation also is described. Where the output current $I_o$ is small, there is a possibility that a current (backward current) flows from the output side (load 4) to the input side (DC input voltage source $V_{dd}$) or the ground (GND).

Figure 4:
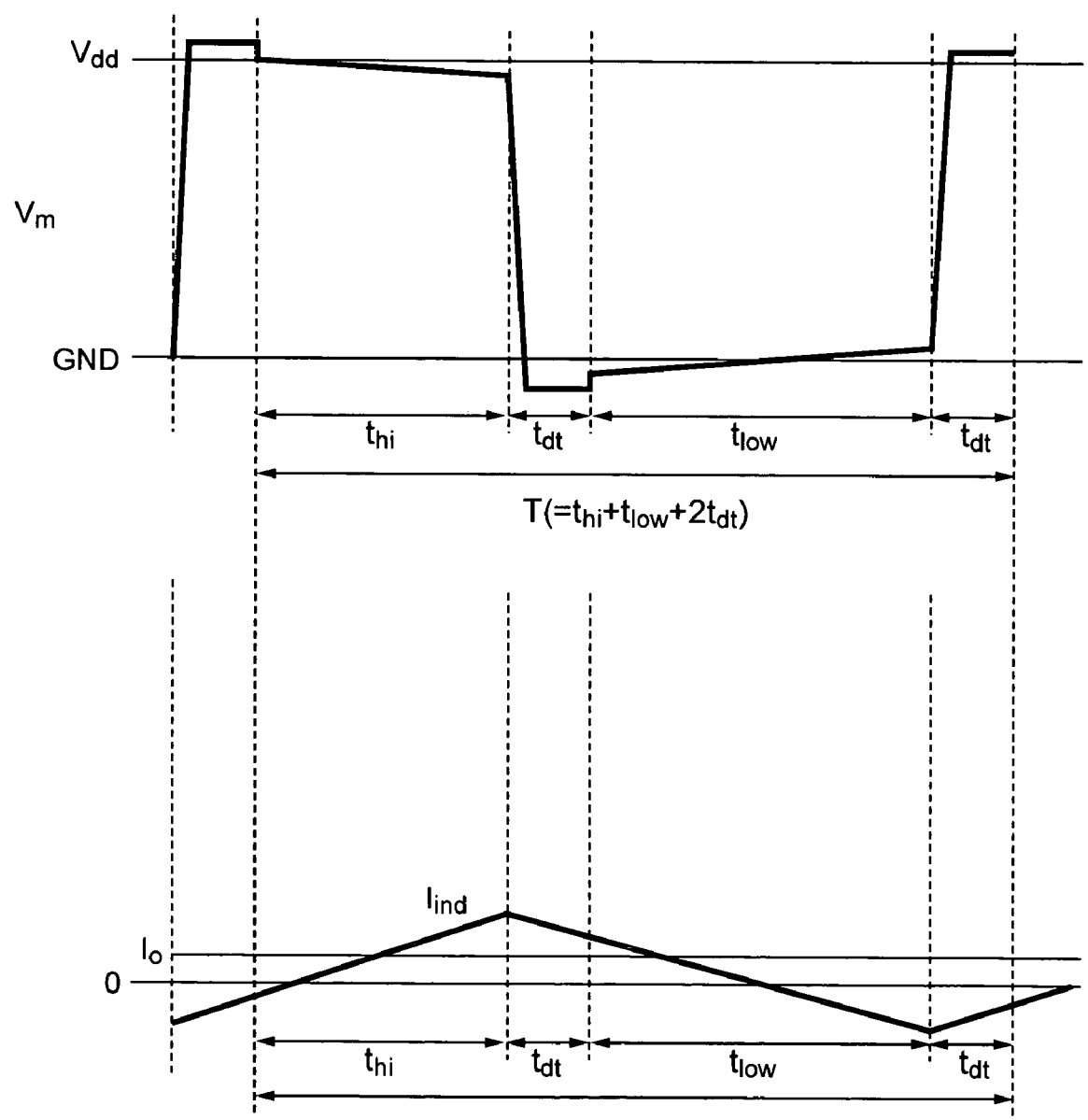
FIG. 4 shows how a voltage $V_m$ at a connecting point M of an inductor L and a current $I_{ind}$ flowing through the inductor L vary in a case where a backward current occurs.

FIG. 4 shows how the voltage $V_m$ at the connecting point M of the inductor L and the current $I_{ind}$ flowing through the inductor L vary in the case where a backward current occurs. Where the output current of the converter is small and a backward current occurs, a negative current flows through the inductor L, and hence the voltage $V_m$ at the connecting point M of the inductor L and the switching circuit 2 is different from that shown in FIG. 2.

During the on-period $t_{hi}$ of the high-side switch S1, a current increase $$\{(V_{dd} - I_o \cdot R_{hi}) - (V_o + I_o \cdot R_{ind})\} \cdot (1/L) \cdot t_{hi}$$

occurs in the same manner as in the first embodiment.

The current decreases in the subsequent dead time $t_{dt}$ and on-period $t_{low}$ of the low-side switch S2. The current decrease is the sum of $$\{(V_o + I_o \cdot R_{ind}) - (-V_f)\} \cdot (1/L) \cdot t_{dt}$$

and $$\{(V_o + I_o \cdot R_{ind}) - (-I_o \cdot R_{low})\} \cdot (1/L) \cdot t_{low}.$$

However, in the latter half of the on-period $t_{low}$ of the low-side switch S2, the current $I_{ind}$ through the inductor L flows backward from the output side to the input side. Therefore, when the low-side switch S2 is turned off, a current flows into the DC input voltage source $V_{dd}$ via the diode D1 (may be a parasitic diode in the case of a MOS transistor) that is connected to the high-side switch S1 in parallel. During that course, the voltage $V_m$ of the connecting point M becomes $V_{dd}+V_f$ and hence the current increases by $$\{(V_{dd}+V_f)-(V_o+I_o \cdot R_{ind})\} \cdot (1/L) \cdot t_{dt}$$

With an assumption that the amount of charge that flows in during each cycle is equal to the amount of charge decrease during the cycle, the output voltage $V_o$ is calculated by the following Equation (7):

$$V_o=t_{hi}(V_{dd}-I_o \cdot R_{hi})+t_{dt}(V_{dd}+V_f)-t_{low} \cdot I_o \cdot R_{low}-t_{dt} \cdot V_f - I_o \cdot R_{ind} \quad (7)$$

In the current detecting device for a DC-DC converter shown in FIG. 1, the potential difference between $V_o$ and $V_{ma}$ is given by Equation (3) even upon the occurrence of a backward current. Therefore, changes, caused by a backward current, of the output voltages $V_o$ and $V_{mb}$ in the current detecting device shown in FIG. 3 will be described here. No change occurs in the output voltage $V_{mb}$ of the low-pass filter 5, that is, it is given by Equation (4), which was derived for the second embodiment. Therefore, from Equations (4) and (7), the voltage difference between $V_{mb}$ and $V_o$ is calculated as:

$$V_{mb}-V_o=(t_{hi} \cdot R_{hi}+t_{low} \cdot R_{low}+R_{ind}) \cdot I_o. \quad (8)$$

Figure 5:
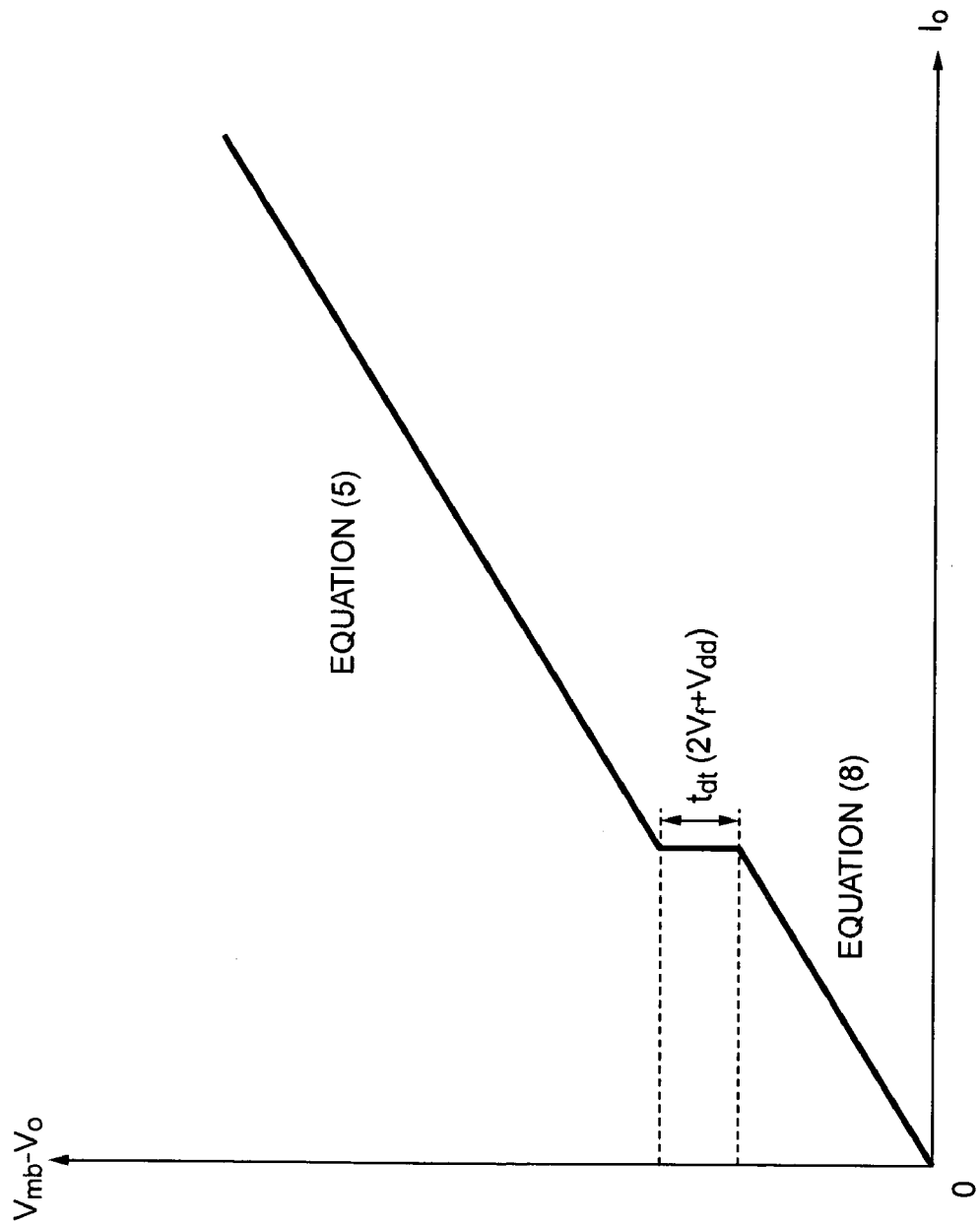
FIG. 5 is a graph showing a relationship between a difference voltage $V_{mb}-V_o$ and an output current Io.

Unlike Equation (5), Equation (8) does not have an offset term that results from the dead time $t_{dt}$. FIG. 5 is a graph in which the horizontal axis represents the output current and the vertical axis represents the difference voltage $V_{mb}-V_o$. As shown in FIG. 5, Equation (8) holds in a range where a backward current occurs, and Equation (5) holds in a range that is free of a backward current. Therefore, a discontinuous portion of $t_{dt}(2V_f+V_{dd})$ exists at the boundary between the two ranges.

The fact that this graph is discontinuous is even favorable in the case of judging whether the load 4 is a light load on the basis of a current variation, because a changing point to a light load where the power conversion efficiency of a converter becomes low usually corresponds to a point in time when a backward current starts to flow. That is, the presence of such a discontinuous boundary portion makes it possible to discriminate, easily and even reliably, between a light load state in which a backward current flows and an ordinary load state that is free of a backward current. Even where such discontinuity is not taken into consideration, since the coefficient term $(t_{hi} \cdot R_{hi}+t_{low} \cdot R_{low}+R_{ind})$ of the output current $I_o$ includes both the on-resistance components of the transistors of the high-side switch S1 and the low-side switch S2 and the parasitic resistance of the inductor L, the slope of the difference voltage $V_{mb}-V_o$ shown in FIG. 5 is steeper than in the case of detection using only the on-resistance components of the transistors. This provides an advantage that a current value can be detected with a high degree of accuracy.

An operation circuit such as an operational amplifier is used for comparing the output voltage $V_o$ applied to the load 4, with the output voltage $V_{ma}$ or $V_{mb}$ of the low-pass filter 5. In this embodiment, if a slow operation unit is employed or designed intentionally, the operation circuit itself of the current detecting device can also serve as the low-pass filter 5. That is, the performance of the low-pass filter 5 of the current detecting device shown in FIG. 1 or 3 need not be very high, and the low-pass filter 5 even can be omitted.

The entire disclosure of the applicant's Japanese priority application, JP 2003-294789, filed Aug. 19, 2003, is incorporated herein by reference.

What is claimed is:

1. A method for detecting a variation in a current supplied to a load that receives variable DC power via a first end of an inductor which is included in a synchronous rectification DC-DC converter, the DC-DC converter also including a first switching element connected to one of two terminals of a DC input power source and a second switching element connected to the other terminal, the first and second switching elements being connected to a second end of the inductor at a connecting point, the method comprising the steps of:
   turning the first and second switching elements on and off alternately in a prescribed switching period;
   filtering a voltage at the connecting point of the first and second switching elements with the second end of the inductor to obtain a filtered voltage; and
   determining an average output current of the DC-DC converter, the determining step comprising finding the difference between the filtered voltage and the voltage at the first end of the inductor.

2. A method for detecting a variation in a current supplied to a load that receives variable DC power via a first end of an inductor which is included in a synchronous rectification DC-DC converter, the DC-DC converter also including a first switching element connected to one of two terminals of a DC input power source and a second switching element connected to the other terminal, the first and second switching elements being connected to a second end of the inductor, the method comprising the steps of:
   turning the first and second switching elements on and off alternately in a prescribed switching period;
   providing third and fourth switching elements that are connected at a connecting point;
   turning the third and fourth switching elements on and off alternately in synchronism with the first and second switching elements;
   filtering a voltage at the connecting point of the third and fourth switching elements to obtain a filtered voltage; and
   determining an average output current of the DC-DC converter, the determining step comprising finding the difference between the filtered voltage and the voltage at the first end of the inductor.

3. A current detecting device for detecting a variation in a current supplied to a load that receives variable DC power via a first end of an inductor which is included in a synchronous rectification DC—DC converter, the converter additionally including first and second switching elements connected to a second end of the inductor at a connection point, the first switching element also being connected to a terminal of a DC input power source and the second switching element also being connected to another terminal of the power source, the first and second switching elements being turned on and off alternately during a prescribed switching period, the current detecting device comprising:
   a signal line connected to the connection point;
   a low-pass filter connected to the signal line to obtain a filtered voltage; and
   means for determining an average output current of the DC-DC converter, the means for determining comprising means for finding the difference between the filtered voltage and the voltage at the first end of the inductor.

4. A current detecting device for detecting a variation in a current supplied to a load that receives variable DC power via a first end of an inductor which is included in a synchronous rectification DC—DC converter, the converter additionally including first and second switching elements connected to a second end the inductor, the first switching element also being connected to a terminal of a DC input power source and the second switching element also being connected to another terminal of the power source, the first and second switching elements being turned on and off alternately during a prescribed switching period, the current detecting device comprising:

third and fourth switching elements connected to each other at a connecting point;

means for turning the third and fourth switching elements on and off alternately in synchronism with the first and second switching elements, respectively;

a low-pass filter connected to a signal line that leads from the connecting point of the third and fourth switching elements to obtain a filtered voltage; and means for determining an average output current of the DC-DC converter, the means for determining comprising means for finding the difference between the filtered voltage and the voltage at the first end of the inductor.

5. A power supply apparatus, comprising:

a synchronous rectification DC-DC converter for supplying variable DC power to a load, the converter including:

an inductor having a first end that is connected to the load, the converter having first and second switching elements connected to respective terminals of a DC input power source, a second end of the inductor being connected to the first and second switching elements at a connecting point, and a control circuit for turning the first and second switching elements on and off alternately during a prescribed switching period; and a current detecting device for detecting a variation in a current being supplied to the load, the control circuit including:

a low-pass filter connected via a signal line to the connecting point to obtain a filtered voltage, and means for determining an average output current of the DC-DC converters, the means for determining comprising means for finding the difference between the filtered voltage and the voltage at the first end of the inductor.

6. A power supply apparatus, comprising:

a synchronous rectification DC-DC converter for supplying variable DC power to a load, the converter including:

an inductor having a first end that is connected to the load, first switching and second elements connected to respective terminals of a DC input power source, and a control circuit for turning the first and second switching elements on and off alternately during a prescribed switching period; and a current detecting device, the current detecting device including:

third and fourth switching elements connected to the control circuit so as to be turned on and off alternately in synchronism with the first and second switching elements, respectively, the first and second switching elements being connected to one another at a connecting point, a low-pass filter connected via a signal line to the connecting point to obtain a filtered voltage, and means for determining an average output current of the DC-DC converter, the means for determining comprising means for finding the difference between the filtered voltage and the voltage at the first end of the inductor.

* * * * *